(12) United States Patent  (10) Patent No.: US 7,432,911 B2
Skarine  (45) Date of Patent: Oct. 7, 2008

(54) KEYBOARD FOR MOBILE DEVICES

(75) Inventor: Alexei Skarine, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 648 days.

(21) Appl. No.: 10/785,999

(22) Filed: Feb. 26, 2004

(65) Prior Publication Data

US 2005/0190159 A1  Sep. 1, 2005

(51) Int. Cl.
*G06F 3/02* (2006.01)
(52) U.S. Cl. .................... 345/168; 200/314; 341/31; 455/566
(58) Field of Classification Search ......... 345/156–184; 200/314; 341/31; 455/566
See application file for complete search history.

(56) References Cited

U.S. PATENT DOCUMENTS

| | | | | |
|---|---|---|---|---|
| 4,551,717 A | * | 11/1985 | Dreher | 345/170 |
| 5,499,041 A | * | 3/1996 | Brandenburg et al. | 345/174 |
| 5,742,894 A | | 4/1998 | Jambhekar et al. | |
| 5,821,881 A | | 10/1998 | Fischer et al. | |
| 6,243,080 B1 | * | 6/2001 | Molne | 345/173 |
| 6,747,635 B2 | * | 6/2004 | Ossia | 345/169 |
| 6,824,321 B2 | * | 11/2004 | Ward et al. | 400/479 |
| 7,151,528 B2 | * | 12/2006 | Taylor et al. | 345/168 |

FOREIGN PATENT DOCUMENTS

| | | |
|---|---|---|
| EP | 1 292 086 | 3/2003 |
| JP | 2000284857 | 10/2000 |
| WO | WO 01/75580 | 10/2001 |

OTHER PUBLICATIONS

European Search Report. Application No. 04 251 099.0—2224 Date: Feb. 22, 2006.
European Summons to attend oral proceedings pursuant to Rule 71(1) EPC. Application No. 04251099.0 Dated Nov. 14, 2006.
Canadian First Office Action. Application No. 2,497,122. Dated: May 6, 2008.

* cited by examiner

*Primary Examiner*—Kevin M Nguyen
(74) *Attorney, Agent, or Firm*—Bereskin & Parr

(57) ABSTRACT

A keyboard comprising a plurality of transparent keys. In use, the keyboard is attached to a device such as a mobile device, to overlie a display screen of the device. One or more images displayed on the display screen are made visible to a user through the keys, which may be pressed by a user. User input is determined by identifying a pressed key, and the image or part thereof visible through the key when pressed.

16 Claims, 7 Drawing Sheets

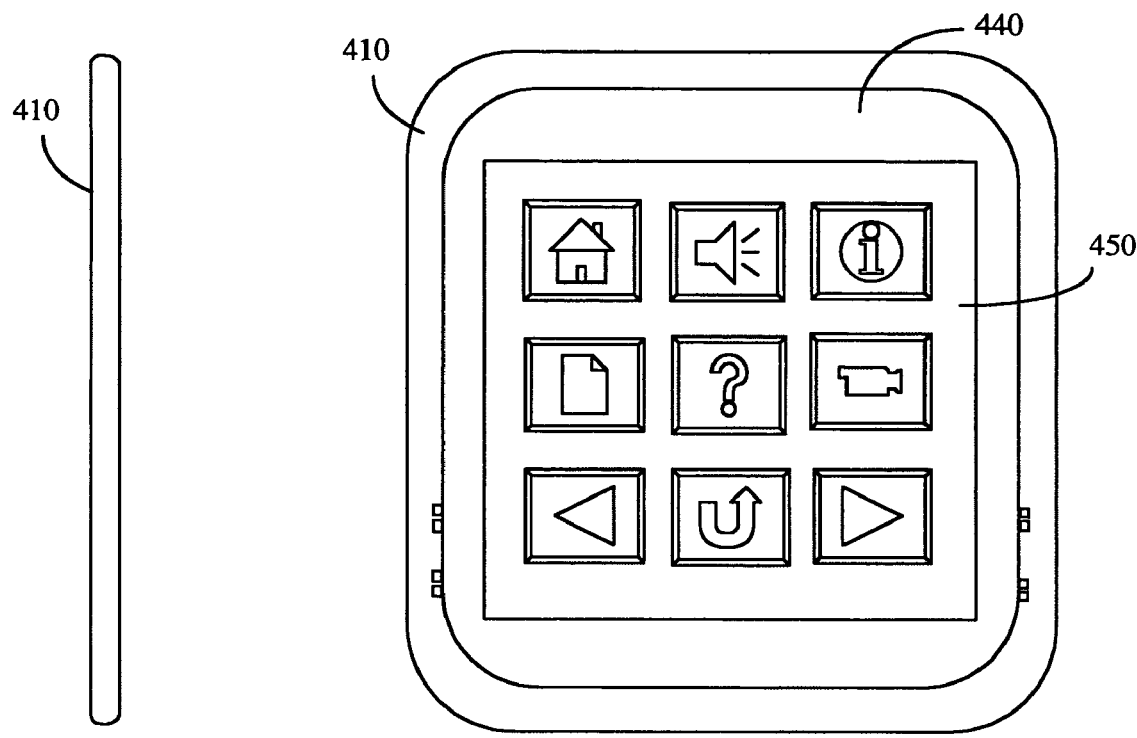
FIG. 5A  FIG. 5B
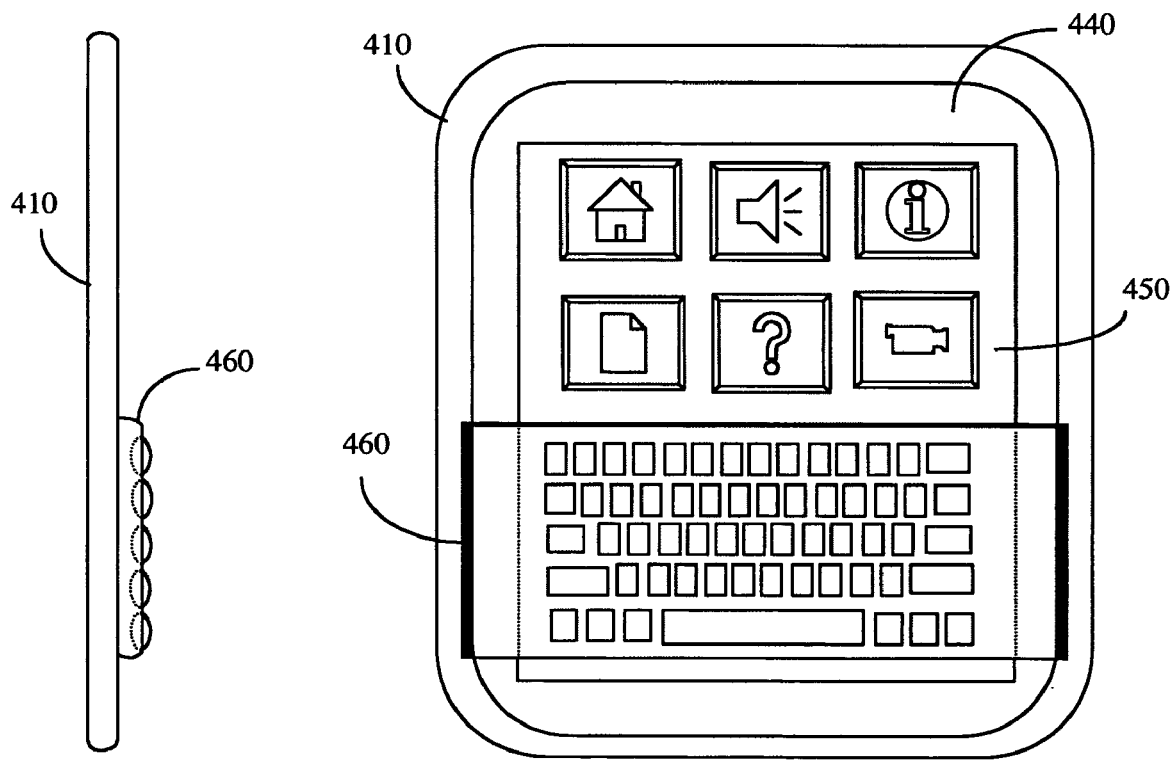
FIG. 6A  FIG. 6B

KEYBOARD FOR MOBILE DEVICES

FIELD OF THE INVENTION

Embodiments of the invention relate generally to mobile devices, and more particularly to a data input apparatus for use with mobile devices.

BACKGROUND OF THE INVENTION

A number of different data input devices are commonly used in association with mobile devices.

For example, data may be input via a keyboard. The terms keypad or keyboard are typically used to describe a hardware device consisting of a number of mechanical buttons ("keys") which are pressed to input characters into a computing or electronic device. The keyboard is generally connected to a processor, which scans the keyboard and detects which key or keys are being pressed. Keyboards can vary in the keys that they have, although many have alphanumeric keys as well as various function and special purpose keys. Many conventional keyboards typically comprise keys upon which character indicia are permanently printed, to allow users to easily identify specific keys that are associated with pre-determined characters.

As a further example, data may be entered via graphical input devices. Certain graphical input devices, such as a mouse or touch pad, are primarily used for positioning and identifying objects displayed on a display screen. Other graphical input devices allow direct graphical input, such as drawing tablets or touch screens. The terms touch panel or touch screen are typically used to describe a touch-sensitive film or plate positioned on a display screen or other device surface that permits the determination of a touch position of a finger, stylus, or other pen-like instrument.

As modern mobile devices have become increasingly functional, more users are seeking greater flexibility in the number and types of input devices that can be used with mobile devices. However, the compact nature and desired portability of such mobile devices places limitations on the input devices that can be supported for use by such users. For example, while there may be distinct advantages associated with finger-actuated keyboards and touch screens, the size and desired portability of mobile devices may limit the degree to which such input devices can be supported simultaneously.

SUMMARY OF THE INVENTION

Embodiments of the invention are directed to a mobile device and a keyboard therefor, in which the keyboard co-operates with a display screen on the mobile device to provide users with an improved input data means.

In one broad aspect of the invention, there is provided a mobile device and a keyboard, where the keyboard comprises a plurality of transparent keys. In use, the keyboard is attached to the mobile device to overlie a display screen of the mobile device. One or more images displayed on the display screen are made visible to a user through the keys of the keyboard, which may be pressed by a user to enter data into the mobile device. User input is determined by detecting pressed keys, and identifying the image or part thereof visible through the keys when pressed.

In another broad aspect of the invention, the keyboard is attached to the mobile device to overlie a touch-sensitive element overlying or integrated with the touch screen of the mobile device. One or more images displayed on the display screen are made visible to a user through the keys of the keyboard, which may be pressed by a user to cause the touch-sensitive element to be touched. User input is determined by detecting the touches, and identifying the image or part thereof visible through the keys when pressed.

In another broad aspect of the invention, the keyboard is removable, in that the housing of the keyboard can be detached from the mobile device.

In another broad aspect of the invention, the keys of the keyboard are shaped to magnify images displayed on a part of the display screen.

In another broad aspect of the invention, the keyboard is reconfigurable by changing images displayed on a part of the display screen.

BRIEF DESCRIPTION OF THE DRAWINGS

These and other features of embodiments of the invention disclosed herein will be made apparent from the following description, with reference to the accompanying drawings, in which:

FIG. 5A and FIG. 5B are side and front views respectively of an example mobile device;

FIG. 6A and FIG. 6B are side and front views respectively of the example mobile device with a keyboard attached thereto;

DETAILED DESCRIPTION OF EMBODIMENTS OF THE INVENTION

Figure 1:
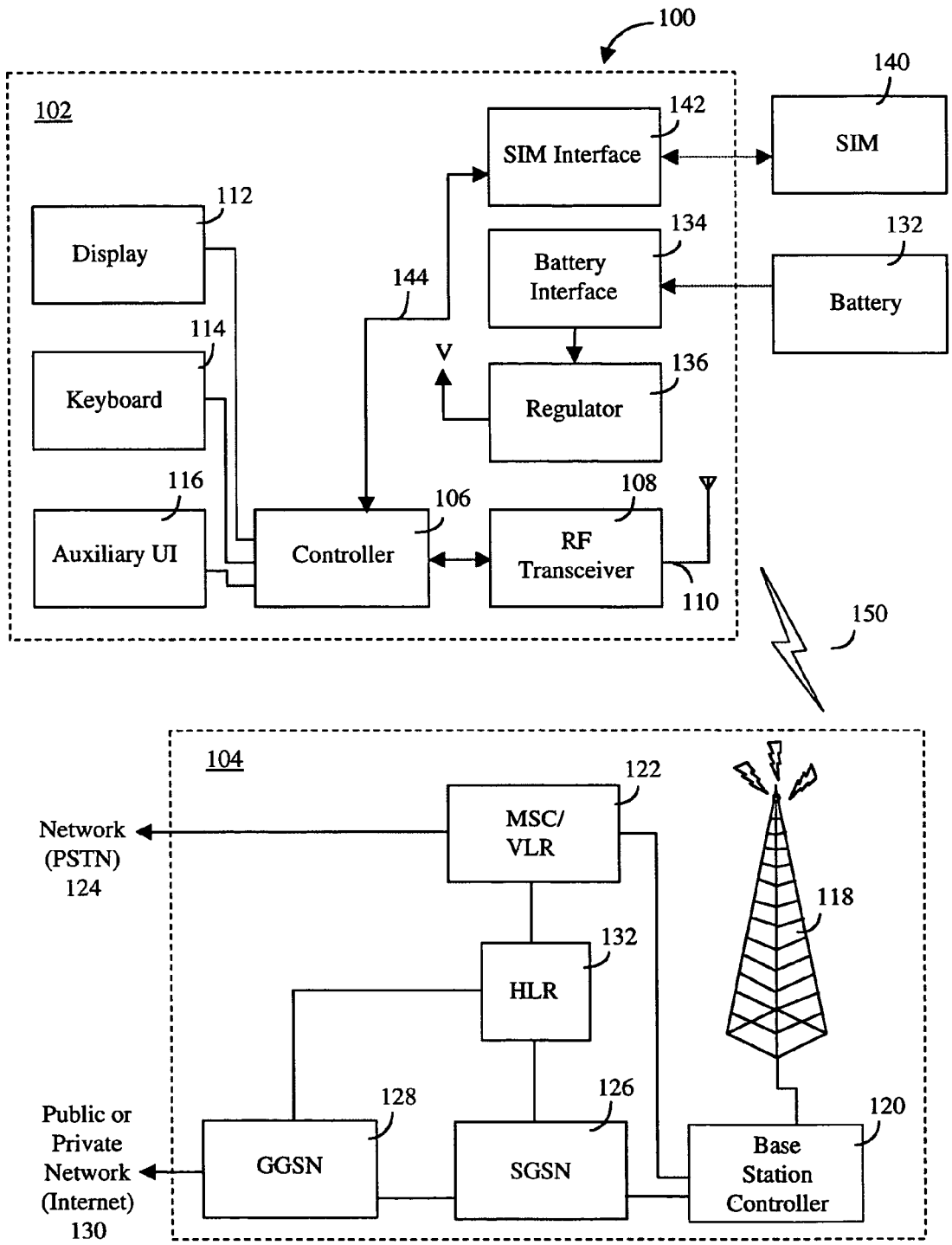
FIG. 1 is a block diagram that illustrates components of one embodiment of a mobile device, which communicates within a wireless communication network.

FIG. 1 is a block diagram of a communication system 100, which includes a mobile device 102 that communicates through a wireless communication network 104. Mobile device 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU), which runs operating system software in a memory component (not shown). Controller 106 will normally control overall operation of mobile device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals from network 104 over a wireless link via antenna 110. RF transceiver circuitry 108 performs functions such as modulation/demodulation and possibly encoding/decoding and encryption/decryption. It will be apparent to those skilled in art that RF transceiver circuitry 108 will be adapted to particular wireless network or networks in which mobile device 102 is intended to operate.

Mobile device 102 includes a battery interface 134 for receiving one or more rechargeable batteries 132. Battery 132 provides electrical power to electrical circuitry in mobile device 102, and battery interface 132 provides for a mechanical and electrical connection for battery 132. Battery interface 132 is coupled to a regulator 136, which regulates power to the device. When mobile device 102 is fully operational, an RF transmitter of RF transceiver circuitry 108 is typically keyed or turned on only when it is sending to a network, and is otherwise turned off to conserve resources. Similarly, an RF receiver of RF transceiver circuitry 108 is typically periodically turned off to conserve power until it is needed to receive signals or information (if at all) during designated time periods.

Mobile device 102 operates using a Subscriber Identity Module (SIM) 140 which is connected to or inserted in mobile device 102 at a SIM interface 142. SIM 140 is one type of a conventional "smart card" used to identify an end user (or subscriber) of mobile device 102 and to personalize the device, among other things. Without SIM 140, the mobile device terminal is not fully operational for communication through wireless network 104. By inserting SIM 140 into mobile device 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile device. SIM 140 may store additional user information for the mobile device as well, including datebook (or calendar) information and recent call information.

Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile device 102 may have a more particular implementation as described later in relation to mobile device 202 of FIG. 2.

Mobile device 102 communicates in and through wireless communication network 104. In the embodiment of FIG. 1, wireless network 104 is configured in accordance with General Packet Radio Service (GPRS) and a Global Systems for Mobile (GSM) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 is a fixed transceiver station, and station 118 and BSC 120 are together referred to herein as the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 118. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks.

The wireless link 150 of FIG. 1 represents one or more different channels, typically different radio frequency (RF) channels, and associated protocols used between wireless network 104 and mobile device 102. An RF channel is a limited resource that must be conserved, typically due to limits in overall bandwidth and a limited battery power of mobile device 102. Those skilled in art will appreciate that a wireless network in actual practice may include hundreds of cells, each served by a station 118 (or station sector), depending upon desired overall expanse of network coverage. All pertinent components may be connected by multiple switches and routers (not shown), controlled by multiple network controllers.

For all mobile devices 102 registered with a network operator, permanent data (such as mobile device 102 user's profile) as well as temporary data (such as mobile device's 102 current location) are stored in HLR 132. In case of a voice call to mobile device 102, HLR 132 is queried to determine the current location of mobile device 102. A Visitor Location Register (VLR) of MSC 122 is responsible for a group of location areas and stores the data of those mobile devices that are currently in its area of responsibility. This includes parts of the permanent mobile device data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile devices. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile device 102 or by the fixed transceiver equipment instructing mobile device 102 to select a particular cell. Mobile device 102 informs wireless network 104 when it reselects another cell or group of cells, known as a routing area.

In order to access GPRS services, mobile device 102 first makes its presence known to wireless network 104 by performing what is known as a GPRS "attach". This operation establishes a logical link between mobile device 102 and SGSN 126 and makes mobile device 102 available to receive, for example, pages via SGSN, notifications of incoming GPRS data, or SMS messages over GPRS. In order to send and receive GPRS data, mobile device 102 assists in activating the packet data address that it wants to use. This operation makes mobile device 102 known to GGSN 128; interworking with external data networks can thereafter commence. User data may be transferred transparently between mobile device 102 and the external data networks using, for example, encapsulation and tunneling. Data packets are equipped with GPRS-specific protocol information and transferred between mobile device 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviors at the wireless link.

Figure 2:
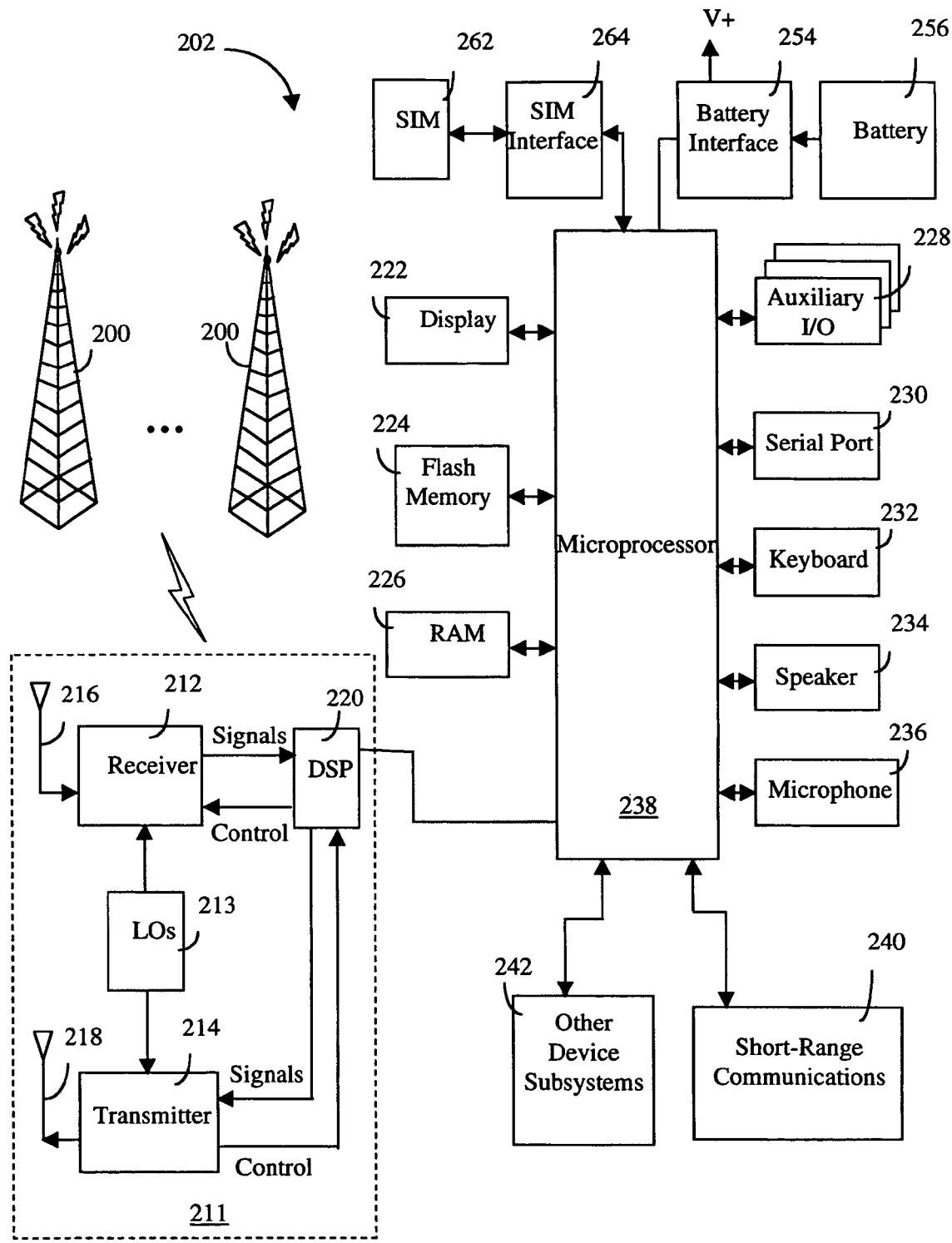
FIG. 2 is a more detailed diagram of the mobile device of FIG. 1.

FIG. 2 is a detailed block diagram of a mobile device 202 (e.g. mobile device 102 of FIG. 1). Mobile device 202 is preferably a two-way communication device having at least voice and advanced data communication capabilities, including the capability to communicate with other computer systems. Depending on the functionality provided by mobile device 202, it may be referred to as a data messaging device, a two-way pager, a cellular telephone with data messaging capabilities, a wireless Internet appliance, or a data communication device (with or without telephony capabilities). Mobile device 202 may communicate with any one of a plurality of fixed transceiver stations 200 within its geographic coverage area.

Mobile device 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile device 202 is intended to operate.

Mobile device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile device 202, and therefore mobile device 202 requires a Subscriber Identity Module or "SIM" card 262 to be inserted in a SIM interface 264 in order to operate in the network. SIM 262 includes those features described in relation to FIG. 1. Mobile device 202 is a battery-powered device so it also includes a battery interface 254 for receiving one or more rechargeable batteries 256. Such a battery 256 provides electrical power to most, if not all electrical circuitry in mobile device 202, and battery interface 254 provides for a mechanical and electrical connection for it. The battery interface 254 is coupled to a regulator (not shown), which provides power V+ to all of the circuitry.

Mobile device 202 includes a microprocessor 238 (which is one implementation of controller 106 of FIG. 1), which controls overall operation of mobile device 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications which control basic device operations, including at least data and voice communication applications (such as a network reestablishment scheme), will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile device user's corresponding data items stored and/or associated with a host computer system thereby creating a mirrored host computer on mobile device 202 with respect to such items. This is especially advantageous where the host computer system is the mobile device user's office computer system. Additional applications may also be loaded onto mobile device 202 through the communications network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile device 202 is substantially similar, except that the received signals would be output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional optional component which provides for communication between mobile device 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
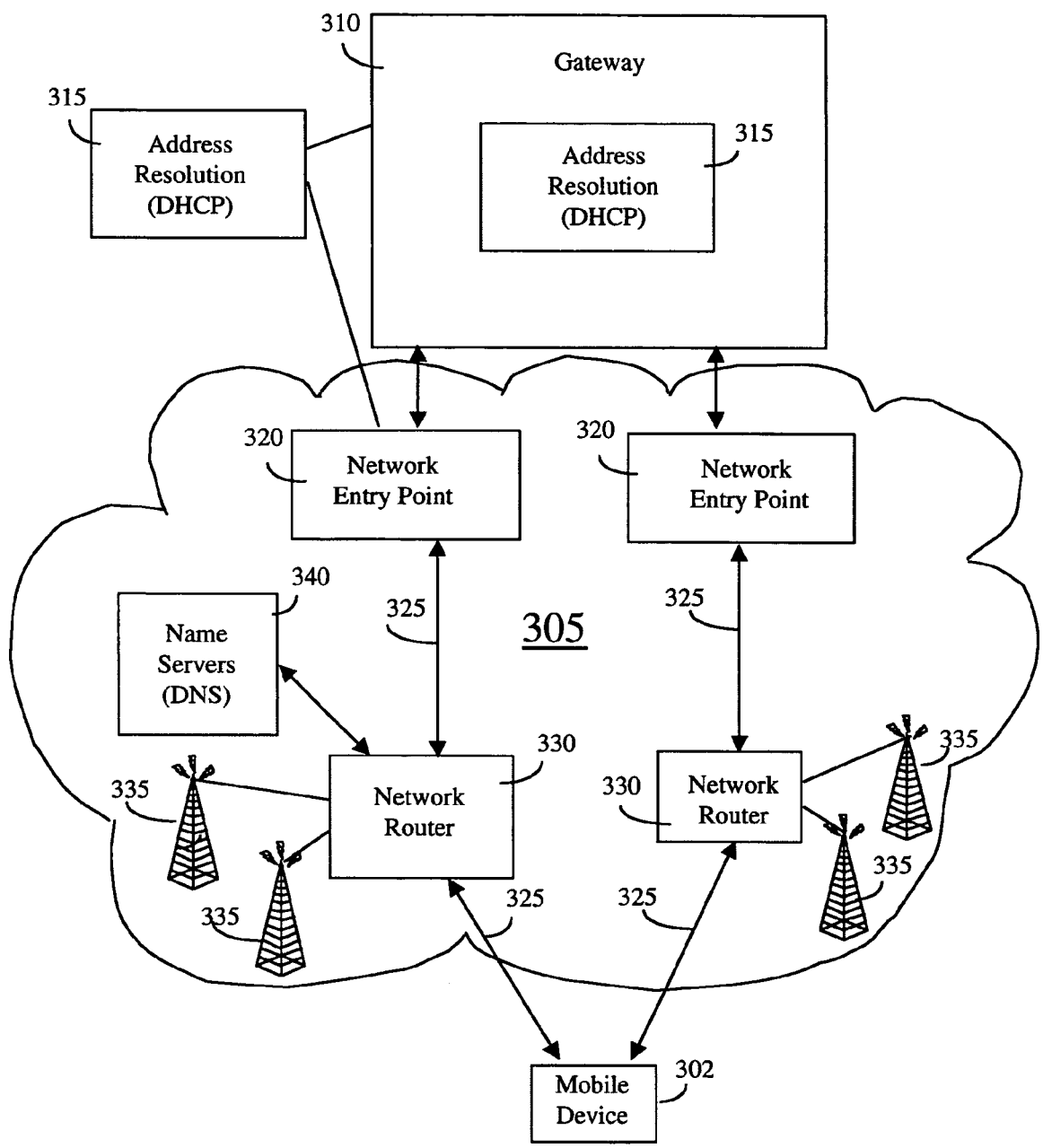
FIG. 3 is an example structure of a system for communication with the mobile device of FIG. 1.

FIG. 3 shows an example system structure for communicating with a mobile device. In particular, FIG. 3 shows basic components of one example of an IP-based wireless data network which may be utilized. Mobile device 302 (e.g. mobile device 102 and 202 of FIG. 1 and FIG. 2 respectively) communicates with a wireless packet data network 305, and may also be capable of communicating with a wireless voice network (not shown). As shown in FIG. 3, a gateway 310 may be coupled to an internal or external address resolution component 315 and one or more network entry points 320. Data packets are transmitted from gateway 310, which is a source of information to be transmitted to mobile device 302, through network 305 by setting up a wireless network tunnel 325 from gateway 310 to mobile device 302. In order to create this wireless tunnel 325, a unique network address is associated with mobile device 302. In an IP-based wireless network, however, network addresses are typically not permanently assigned to a particular mobile device 302 but instead are dynamically allocated on an as-needed basis. It is thus preferable for mobile device 302 to acquire a network address and for gateway 310 to determine this address so as to establish wireless tunnel 325.

Network entry point 320 is generally used to multiplex and demultiplex amongst many gateways, corporate servers, and bulk connections such as the Internet, for example. There are normally very few of these network entry points 320, since they are also intended to centralize externally available wireless network services. Network entry points 320 often use some form of an address resolution component 315 that assists in address assignment and lookup between gateways and mobile devices. In this example, address resolution component 315 is shown as a dynamic host configuration protocol (DHCP) as one method for providing an address resolution mechanism.

A central internal component of wireless data network 305 is a network router 330. Normally, network routers 330 are proprietary to the particular network, but they could alternatively be constructed from standard commercially available hardware. The purpose of network routers 330 is to centralize thousands of fixed transceiver stations 335 normally implemented in a relatively large network into a central location for a long-haul connection back to network entry point 320. In some networks there may be multiple tiers of network routers 330 and cases where there are master and slave network routers 330, but in all such cases the functions are similar. Often a network router 330 will access a name server 340, in this case shown as a dynamic name server (DNS) 340 as used in the Internet, to look up destinations for routing data messages. Fixed transceiver stations 335, as described above, provide wireless links to mobile devices such as mobile device 302.

Wireless network tunnels such as a wireless tunnel 325 are opened across wireless network 305 in order to allocate necessary memory, routing, and address resources to deliver IP packets. Such tunnels 325 are established as part of what are referred to as Packet Data Protocol or "PDP contexts" (i.e. data sessions). To open wireless tunnel 325, mobile device 302 must use a specific technique associated with wireless network 305. The step of opening such a wireless tunnel 325 may require mobile device 302 to indicate the domain, or network entry point 320 with which it wishes to open wireless tunnel 325. In this example, the tunnel first reaches network router 330 which uses name server 340 to determine which network entry point 320 matches the domain provided. Multiple wireless tunnels can be opened from one mobile device 302 for redundancy, or to access different gateways and services on the network. Once the domain name is found, the tunnel is then extended to network entry point 320 and necessary resources are allocated at each of the nodes along the way. Network entry point 320 then uses the address resolution component 315 to allocate an IP address for mobile device 302. When an IP address has been allocated to mobile device 302 and communicated to gateway 310, information can then be forwarded from gateway 310 to mobile device 302.

Wireless tunnel 325 typically has a limited life, depending on mobile device's 302 coverage profile and activity. Wireless network 305 will tear down wireless tunnel 325 after a certain period of inactivity or out-of-coverage period, in order to recapture resources held by this wireless tunnel 325 for other users. The main reason for this is to reclaim the IP address temporarily reserved for mobile device 302 when wireless tunnel 325 was first opened. Once the IP address is lost and wireless tunnel 325 is torn down, gateway 310 loses all ability to initiate IP data packets to mobile device 302, whether over Transmission Control Protocol (TCP) or over User Datagram Protocol (UDP).

An example of an invention that co-operates with a display screen of a mobile device (e.g. mobile device 202 of FIG. 2) to provide users with an improved input data means, will now be described.

Figure 4:
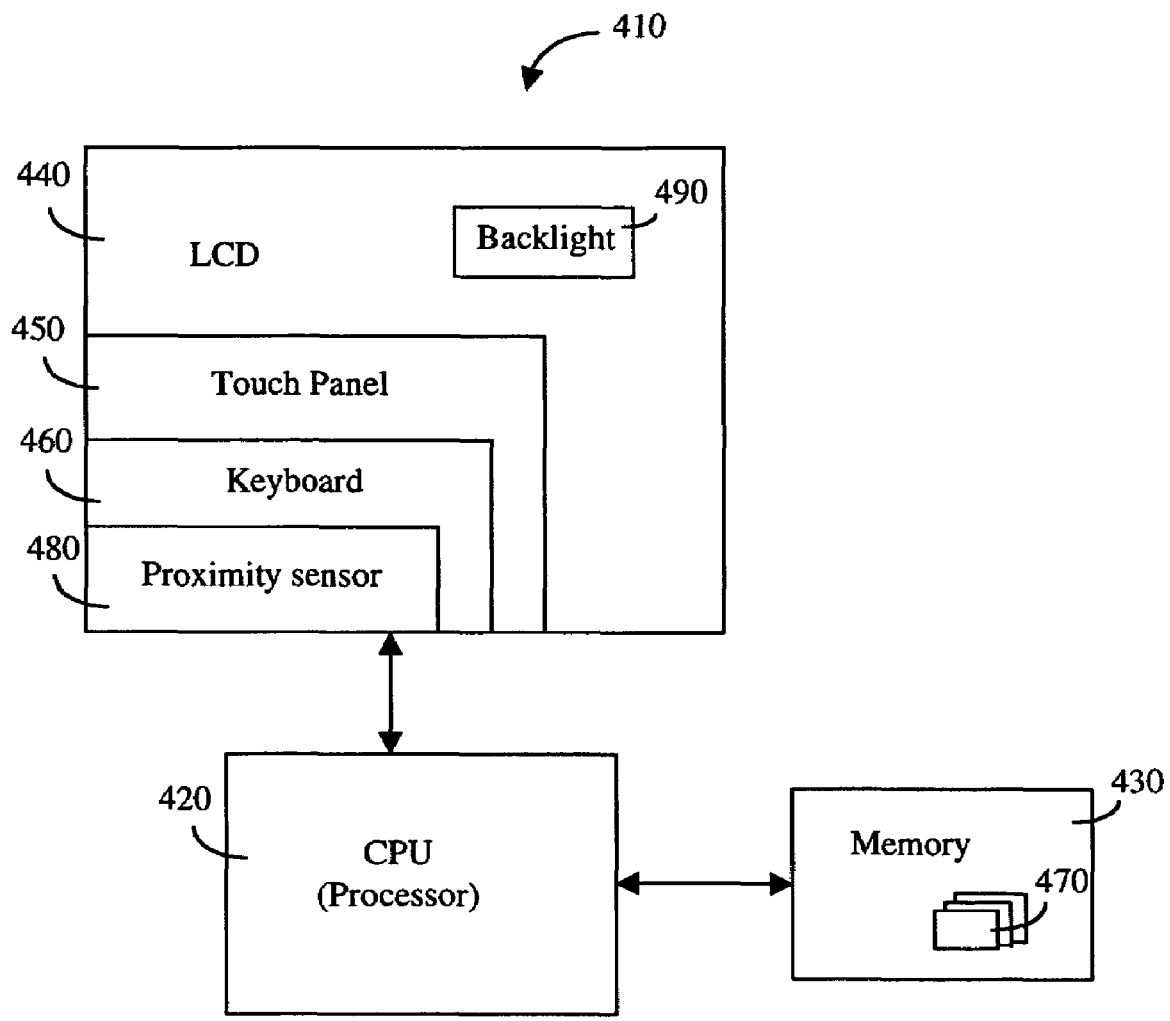
FIG. 4 is a schematic diagram illustrating components of a mobile device in an embodiment of the invention.

Referring to FIG. 4, there is shown a schematic diagram of a mobile device 410 in accordance with an embodiment of the invention. Mobile device 410 comprises a central processing unit (CPU) 420 (e.g. microprocessor 238 of FIG. 2), a memory 430 coupled to CPU 420 (e.g. RAM 226 of FIG. 2), and a number of input and output devices controlled by CPU 420, including a monochrome or color liquid crystal display screen (LCD) 440 (e.g. display 222 of FIG. 2), and a digital or analog touch panel 450. A keyboard 460 (e.g. keyboard 232 of FIG. 2) is also provided for use with mobile device 410 in this embodiment of the invention.

In the operation of mobile device 410, CPU 420 is controlled by one or more processing modules 470 embodying instructions for CPU 420, loaded into memory 430. Intermediate calculations and data may also be stored in memory 430 during operation of mobile device 410.

It will be understood by persons skilled in the art, that mobile device 410 will typically include other hardware and software components (e.g. as may be described with reference to FIG. 1 and FIG. 2) that have not been described with reference to FIG. 4, in order not to obscure the details of this embodiment of the invention. Such components may include, for example, a bus for communicating data, a read-only memory or other non-volatile storage device(s) for storing instructions and/or data, and components to facilitate communication (e.g. wireless) with other devices in a network.

In this embodiment, touch panel 450 overlies LCD 440, and covers the entire surface of LCD 440. Keyboard 460 can attach to mobile device 410 to overlie both a part of LCD 440 and a part of touch panel 450. This leaves a part of LCD 440 visible to users, and preferably unobstructed by keys of keyboard 460, to provide a separate display section for data. A part of touch panel 450 is also left unobstructed by keys of keyboard 460 and accessible to users. This allows both touch panel 450 and keyboard 460 to receive user input from users of mobile device 410. Accordingly, mobile device 410 is adapted to provide the combined functionality of both a touch-sensitive element and a keyboard in a single device, in this embodiment of the invention.

While touch panel 450 is preferably sufficiently large to offer users the option of using either touch panel 450 or keyboard 460 for providing input when keyboard 460 is attached to mobile device 410, in variant embodiments of the invention, keyboard 460 may completely overlie touch panel 450 such that a separate input area is not provided.

Furthermore, in variant embodiments of the invention, touch panel 450 may only overlie a part of LCD 440. LCD 440 may also comprise multiple display areas, which need not be adjacent, in variant embodiments of the invention.

Touch panel 450 may be of a resistive, capacitive, scanning infrared (IR), or surface acoustic wave (SAW) type, for example.

FIG. 5A and FIG. 5B illustrate an example mobile device 410 to which a keyboard has not been attached, while FIG. 6A and FIG. 6B illustrate the example mobile device 410 to which keyboard 460 is attached. It will be understood by persons skilled in the art that the appearance and configuration of the mobile device and keyboard as shown in these figures are provided by way of example only, and may be varied without limiting the scope of the invention.

As will be explained in greater detail with reference to the remaining figures, according to one embodiment of the invention, the keys of keyboard 460 can be pressed by a user, such that a surface of a pressed key touches a point on or an area of the underlying touch panel 450. This touch is detected by touch panel 450, and a signal is generated and transmitted to CPU 420 (FIG. 4), identifying the touch position on touch panel 450. Processing modules 470 (FIG. 4) are programmed to associate the touch position with a character associated with the pressed key, to determine user input.

With keyboard 460 and touch panel 450 arranged as described herein with respect to one embodiment of the invention, unlike traditional keyboards that may be used with mobile devices, a separate connection between keyboard 460 and CPU 420 is not required, as keyboard 460 and touch panel 450 may utilize a common interrupt line (i.e. the interrupt line of touch panel 450).

The keys of keyboard 460 are preferably transparent, to allow one or more images, displayed on LCD 440 underlying keyboard 460, to be viewed through touch panel 450 and the keys to a user. In an embodiment of the invention, one or more images depict a keyboard or characters thereof. Accordingly, it is not necessary to have character indicia permanently printed on the keys of keyboard 460, as the characters to be associated with the keys are displayed on LCD 440, and viewed through the keys of keyboard 460. For example, an image of a standard QWERTY keyboard may be displayed on LCD 440, such that the keys of keyboard 460 directly overlap the characters on the keyboard image.

In one embodiment of the invention, the use of transparent keys facilitates a reconfiguration of keyboard 460, and keyboard 460 may be reconfigured dynamically at the request of a user, or as instructed by an application being executed by CPU 420, for example. Processing modules 470 are programmed to customize or reconfigure keyboard 460, by changing the images displayed on LCD 440 underlying keyboard 460. For example, an image of a standard QWERTY keyboard may be displayed on LCD 440 by default. Keyboard 460 may then be reconfigured by changing the image displayed on LCD 440 underlying keyboard 460, in order to associate different characters with the keys. By identifying the corresponding image (e.g. of a character) visible to the user when a key has been pressed, processing modules 470 determine user input as provided on the reconfigured keyboard.

As the configuration of keyboard 460 is defined by the representation on LCD 440, numerous keyboard configurations can be made available to users. For example, the keys of keyboard 460 need not only be associated with alphanumeric characters or characters from the ASCII character set. Keys associated with various functions or other special purposes identified using a word or code (e.g. esc, F1, shift, etc.), a symbol, or graphic displayed on LCD 440, for example, may also be used. Keyboard 460 may also be configured to support the use of other character sets, including those that comprise foreign language characters, for example.

The representation of keyboard 460 or characters thereof on LCD 440 may also be modified to customize and dynamically change the appearance of keys, including the color of one or more keys, the size of the character indicia of one or more keys, or some other property that may be used to either emphasize or de-emphasize one or more keys with respect to others, for example.

The number, arrangement, and shape of the physical keys on keyboard 460, (and accordingly, the underlying representation of the keyboard on LCD 440) may also vary in variant implementations of the invention. For example, keyboard 460 may comprise only enough keys to provide a user with the facility of a numeric keypad. Keyboard 460 may also be customized to provide a user with a number of keys that may be used to select items from a menu (the menu need not resemble a keyboard, and may take on the form of a list of items, a graphical menu, or other menu style, for example) displayed on LCD 440. It will be understood by persons skilled in the art that numerous other configurations and variations of keyboard 460 may be used in various embodiments of the invention.

In an embodiment of the invention, keyboard 460 is removable, and may be attached to or detached from mobile device 410 as desired by a user. Mobile device 410 may comprise a casing shaped to receive keyboard 460, and/or mechanisms (e.g. mechanical, magnetic) to more securely attach keyboard 460 to mobile device, as known in the art.

In one embodiment of the invention, mobile device 410 is equipped with a proximity sensor 480 for detecting whether keyboard 460 is attached to the body of mobile device 410. Proximity sensor 480 may comprise a sensing element provided on one of the body of mobile device 410 and keyboard 460, and an element capable of being sensed by the sensing element provided on the other of the body of mobile device 410 and keyboard 460 capable of being sensed by the sensing element. Proximity sensor 480 may be a reflective photo sensor, a magnetic hall effect sensor, or a magnetic reed sensor, for example.

Optionally, when proximity sensor 480 detects that keyboard 460 is not attached to the body of mobile device 410, the mode of operation of mobile device 410 may be changed by CPU 420. For example, when keyboard 460 is not attached to the body of mobile device 410, the display on LCD 440 may be changed to enlarge the effective display area by removing images previously displaying a keyboard or characters thereof. The user would then provide input by way of touch panel 450.

Mobile device 410 may also be equipped with a backlight 490 to illuminate LCD 440 and touch panel 450, to make text and images displayed on LCD 440 easier to view. Backlight 490 may be positioned so as to illuminate both LCD 440 and keys of keyboard 460 when keyboard 460 is attached to mobile device 410, thereby eliminating the need for keyboard 460 to be equipped with a separate backlight.

Figure 7A:
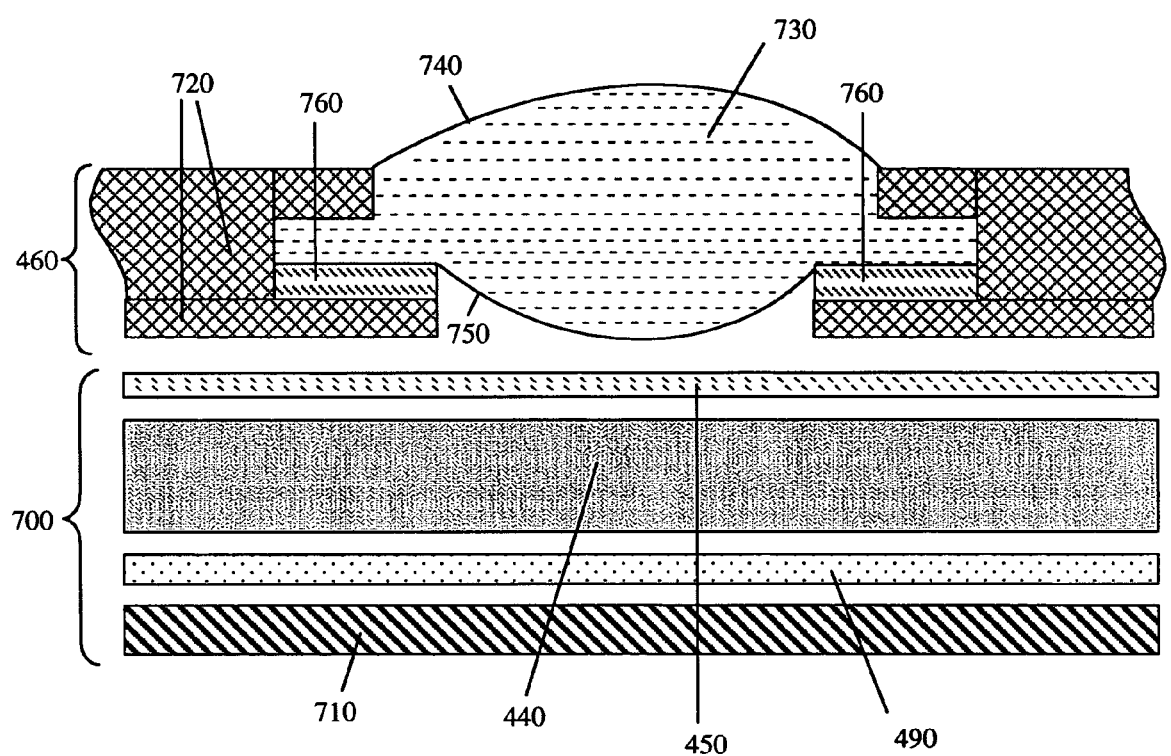
FIG. 7A is a partial, cross-sectional view of the example mobile device with a keyboard attached thereto, in which a key is shown in a raised position.
Figure 7B:
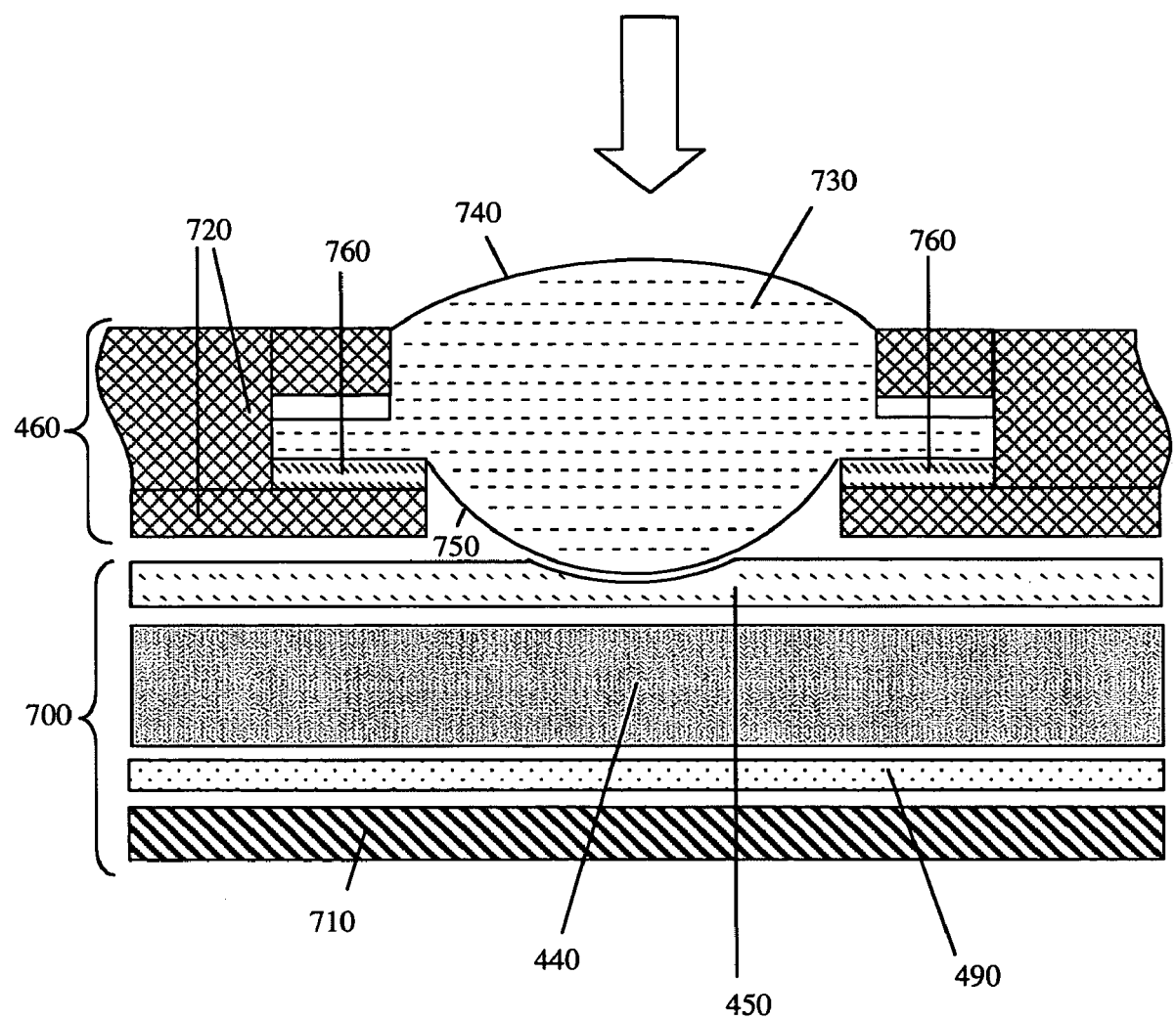
FIG. 7B is a partial, cross-sectional view of the example mobile device with a keyboard attached thereto, in which the key is shown in a pressed position.

Referring to FIG. 7A and FIG. 7B, partial cross-sectional views of the example mobile device are provided, illustrating a key in raised and pressed positions respectively in an embodiment of the invention.

When attached to the body 700 of mobile device 410, keyboard 460 overlies touch panel 450, LCD 440, backlight 490, and printed circuit board 710. A proximity sensor [not shown] may be employed to detect when keyboard 460 has been attached to body 700 of mobile device 410. Keyboard 460 comprises a housing 720 that supports keys 730 of keyboard 460. Each key 730 is transparent, and provides a precision touch footprint for touch panel 450.

In this embodiment of the invention, each key 730 is of a lens-like shape, having an upper surface 740 and an opposing lower surface 750, both of which are convex. This serves to magnify underlying images on LCD 440 for better viewing. In variant embodiments of the invention, keys 730 may be adapted to magnify underlying images on LCD 440 in a different manner (e.g. by embedding a magnifying element in a housing of a different shape).

Each key 730 preferably also has a sufficiently large upper surface 740 to support finger actuation. Keyboard 460 may allow users to press specific keys 730 more easily, compared to an option of directly selecting from images of keys displayed on LCD 440. Key images on LCD 440 may appear relatively small and may be grouped together in a manner that makes it difficult to accurately select a desired key, particularly with a finger.

Keyboard 460 also comprises one or more actuators 760 that support each key 730, to bias key 730 in a raised position in which key 730 does not touch the touch panel 450. Actuators 760 may be made of rubber or some other compressible material, for example.

Referring to FIG. 7B, in the operation of keyboard 460, a key 730 may be pressed at its upper surface 740 by a user, in the direction shown by the arrow. When key 730 is pressed, actuators 760 supporting key 730 compress, allowing key 730 to move from a raised position to a pressed position in which lower surface 750 of key 730 touches touch panel 450. Actuators 760 provide tactile feedback to the user when key 730 is pressed. When key 730 is released by the user, actuators 760 move key 730 back to a raised position, as shown in FIG. 7A.

Although key 730 directly touches touch panel 450 (at its lower surface 750) when key 730 is pressed in one embodiment of the invention, in variant embodiments of the invention, touch panel 450 may be touched indirectly when key 730 is pressed. For example, when key 730 is pressed, lower surface 750 may cause touch panel 450 to be pressed by applying pressure to a film, plate, or other intermediate element between lower surface 750 of key 730 and touch panel 450, for example. In variant embodiments of the invention, a touch-sensitive element may be integrated with a display. As a further example, touch panel 450 may also be pressed by some other element that is actuated by key 730, when key 730 is pressed.

In variant embodiments of the invention, keyboard 460 may overlie a touch panel 450 that is designed to provide tactile feedback to a user.

Embodiments of the invention may be applied not only to mobile devices, but also to other computing devices or electronic devices where data input via keyboard is desired. For example, embodiments of the invention may be applied to handheld electronic devices, which can include PDAs that are not necessarily wirelessly enabled.

As a keyboard that co-operates with a touch screen to input data is provided in various embodiments of the invention, the keyboard may also be adapted for use with existing mobile devices or other computing devices already equipped with a touch screen. However, this may require the mobile device or other computing device to execute application software specifically customized to support the keyboard designed in accordance with the embodiments described herein.

In variant embodiments of the invention, the keyboard may comprise transparent keys that overlie a display but do not overlie a touch screen. Such a keyboard may also be adapted for use with existing mobile devices or other computing devices already equipped with a display. However, this may require the mobile device or other computing device to execute application software specifically customized to support the keyboard designed in accordance with these embodiments of the invention. Furthermore, the keyboard will typically be equipped with its own connection to the mobile device, to transmit signals to a processor. The interrupt signals received from the keyboard are used to identify which keys are pressed.

The invention has been described with regard to a number of embodiments. However, it will be understood by persons skilled in the art that other variants and modifications may be made without departing from the scope of the invention as defined in the claims appended hereto.

The invention claimed is:

1. A keyboard, said keyboard for use with a mobile device in which a display screen for displaying output to a user is provided, said keyboard comprising:
   a) a plurality of keys, wherein each key is transparent; and
   b) a housing for supporting said keys, wherein said keyboard is adapted to attach to said mobile device such that said keys overlie at least a part of said display screen, wherein said housing further comprises at least one actuator disposed therein for each of said plurality of keys, wherein each key is biased in a first position by said respective at least one actuator that supports said key,
   wherein said respective at least one actuator is compressible to allow said key to move to a second position when said key is pressed and to move said key back to said first position when said key is released;
   so that in use, when said keyboard is attached to the mobile device, said keyboard overlies a touch-sensitive element and said display screen, and at least one part of one or more images displayed on said at least a part of said display screen is visible to said user through at least one of said plurality of keys;
   wherein said touch-sensitive element overlies said display screen, wherein, in use, said touch-sensitive element is actuated to send one or more signals to a processor when said touch-sensitive element is touched, and wherein said housing is adapted to attach to said mobile device such that said keys overlie at least a part of said touch-sensitive element;
   wherein each key comprises at least first and second surfaces and is moveable within said housing, in use, between said first position in which said key does not touch said touch-sensitive element, and said second position in which said second surface of said key is displaced to actuate said touch-sensitive element, such that when a key of said plurality of keys is pressed at said first surface thereof by said user, said key is moved from said first position to said second position to actuate said touch-sensitive element; and
   wherein each of said plurality of keys is lens-shaped to magnify the at least one part of said images visible to said user therethrough, and wherein said first surface and second surface of each of said plurality of keys oppose each other and are convex in shape to define the lens shape of said key.

2. The keyboard of claim 1, wherein said device is a handheld electronic device.

3. The keyboard of claim 1 wherein said keyboard is also adapted to attach to said device such that at least another part of said touch-sensitive element remains accessible for providing user input and unobstructed by said keys.

4. The keyboard of claim 1, wherein said keyboard is also adapted to attach to said device such that at least another part of said display screen remains visible to said user and unobstructed by said keys.

5. The keyboard of claim 1, wherein each of said at least one actuator that supports each of said plurality of keys is made of rubber.

6. The keyboard of claim 1, wherein said keyboard is further adapted to be attached to and detached from said device by a user.

7. The keyboard of claim 6, further comprising means for permitting a proximity sensor of said device to detect whether said housing is detached from said device.

8. A mobile device comprising a processor and a memory coupled to said processor, at least one processing module controlled by said processor, a display screen coupled to said processor, and a keyboard adapted for use with said mobile device comprising:
   a) a plurality of keys, wherein each key is transparent; and
   b) a housing for supporting said keys, wherein said housing is adapted to attach to said mobile device such that said keys overlie at least a part of said display screen, wherein said housing further comprises at least one actuator disposed therein for each of said plurality of keys, wherein each key is biased in a first position by said respective at least one actuator that supports said key, wherein said respective at least one actuator is compressible to allow said key to move to a second position when said key is pressed and to move said key back to said first position when said key is released;
   wherein said at least one processing module is programmed to display one or more images on said first part of said display screen, such that said keyboard overlies a touch-sensitive element and said display screen when said keyboard is attached to said mobile device, and for each key, at least one part of said images is visible to said user therethrough when said housing is attached to said mobile device, and wherein said at least one processing module is programmed to determine the at least one part of said images visible through said key when pressed;
   wherein said touch-sensitive element overlies said display screen, wherein, in use, said touch-sensitive element is actuated to send one or more signals to a processor when said touch-sensitive element is touched, and wherein said housing is adapted to attach to said mobile device such that said keys overlie at least a part of said touch-sensitive element;
   wherein each key comprises at least first and second surfaces and is moveable within said housing, in use, between said first position in which said key does not touch said touch-sensitive element, and said second position in which said second surface of said key is displaced to actuate said touch-sensitive element, such that when a key of said plurality of keys is pressed at said first surface thereof by said user, said key is moved from said first position to said second position to actuate said touch-sensitive element; and
   wherein each of said plurality of keys is lens-shaped to magnify the at least one part of said images visible to said user therethrough, and wherein said first surface and second surface of each of said plurality of keys oppose each other and are convex in shape to define the lens shape of said key.

9. The device of claim 8, wherein said device is a handheld electronic device.

10. The device of claim 8, wherein said keyboard is also adapted to attach to said device such that at least another part of said touch-sensitive element remains accessible for providing user input and unobstructed by said keys.

11. The device of claim 8, wherein said keyboard is also adapted to attach to said device such that at least another part of said display screen remains visible to said user and unobstructed by said keys.

12. The device of claim 8, wherein said at least one processing module is programmed to reconfigure said keyboard, by changing the one or more images displayed to said user on said first part of said display screen.

13. The device of claim 8, wherein said keyboard is further adapted to be attached to and detached from said device by a user.

14. The device of claim 13, further comprising a proximity sensor for detecting whether said keyboard is detached from said device.

15. The device of claim 8, wherein each of said at least one actuator that supports each of said plurality of keys is made of rubber.

16. The device of claim 8, further comprising a backlight to illuminate said one or more images displayed on said display screen.

* * * * *